Patented July 6, 1954

2,683,132

UNITED STATES PATENT OFFICE 2,683,132

STABILIZED RELATIVELY NONVOLATILE ORGANIC COMPOSITIONS CONTAINING BIS (p-HYDROXY ARYL AMIDES) OF POLYBASIC ACIDS

David W. Young, Roselle, and Delmer L. Cottle, Highland Park, N. J., assignors to Standard Oil Development Company, a corporation of Delaware No Drawing. Application July 11, 1951, Serial No. 236,278

11 Claims. (Cl. 260—45.9)

This invention relates to the stabilization of relatively non-volatile organic materials which tend to deteriorate in storage or in use due to undesirable oxidation reactions. In accordance with this invention, these non-volatile organic materials, and especially rubbers, natural and synthetic, are stabilized against oxidation by incorporating therein small amounts of bis(p-hydroxy aryl amides) of polybasic acids, especially dibasic acids.

Various non-volatile organic compounds and mixtures, including resins, insecticides, soaps, waxes, hormones, vitamins, rubbers, animal and vegetable fats, etc., are adversely affected by oxygen, with the resultant formation of undesirable gums and usually discoloration of the organic compounds as well as other deleterious reactions.

It is known particularly that synthetic rubbers undergo changes due to further polymerization or degradation due to depolymerization on exposure to air and consequently yield on vulcanization inferior products unless there is incorporated therewith at time of synthesis a compound which stabilizes the synthetic rubber by largely preventing oxidation, degradation and/or cyclization of the chain molecules present in the polymer structure. Natural, as well as synthetic, rubbers require an anti-oxidant present in the vulcanizate in order that finished rubber products are stable toward oxidation and heat during their useful life.

Certain p-aminophenols have been employed in the past as anti-oxidants for solid organic materials, but these all suffered from the serious defects of being color unstable and discoloring to substances such as rubbers, enamels, and pigments.

Acetyl-p-aminophenol has also been employed in the past as a stabilizer for liquid petroleum fractions, e. g., gasoline. This chemical did not yield good results, however, even in the liquid petroleum fractions, for several reasons. Its insolubility in gasoline made the use of expensive auxiliary solvents necessary. Even with the employment of the latter the presence of acetyl-p-aminophenol in the gasoline resulted in prohibitive carburetor deposition. In addition it crystallized out of the gasoline at even moderately low temperatures. Finally, its rather high volatility precluded its operating efficiently in relatively non-volatile organic materials.

It has now been found that bis(p-hydroxy aryl amides) of polybasic, especially dibasic, acids are extremely effective oxidation inhibitors and stabilizers for relatively non-volatile organic materials which usually degrade in the presence of air and/or heat. The resulting compositions of this invention do not suffer from any of the above-listed disadvantages of p-aminophenols, i. e., they are color stable and are not staining even in rubbers.

In addition, the low volatility and low water solubility of the bis(p-hydroxy aryl amides) of dibasic acids of this invention make them far superior to acetyl aminophenols for use in relatively non-volatile organic materials. The reason for the utility of the bis(p-hydroxy aryl amides) of dibasic acids in solid organic materials as contrasted to liquid hydrocarbon materials is that they stay dispersed in the matrix of the solid materials such as rubbers or resins. This is especially true of the higher molecular weight bis(p-hydroxy aryl amides) of dibasic acids which are especially unsuited for use in gasolines because of their low volatility.

The term "relatively non-volatile" is employed to connote materials having a minimum boiling point of about 260° C. at 3 mm. Hg.

The preferred compounds of this invention which are believed to be new chemicals are thus bis-(p-hydroxy aryl amides) of dibasic acids. Those compounds wherein the aryl group is a phenyl group are especially effective. Particularly effective and desirable compounds are those compounds in which the aryl group is a phenyl group and the dibasic acid from which the amides are prepared contains at least ten carbon atoms.

The compounds of this invention can be further illustrated by the following general formula:

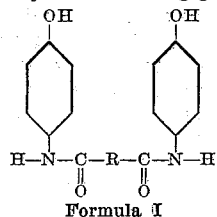

Formula I wherein R is an alkylene, arylene or alkarylene group or any of various combinations of these.

Thus the particular dibasic acids that are preferably condensed to form bis(p-hydroxy phenyl amides) of dibasic acids in the preferred embodiments include, e. g., dilinoleic acid whose structure is believed to be:

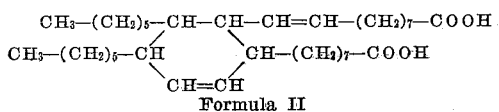

Formula II sebacic, hexadecamethylene dicarboxylic acid, azelaic acid

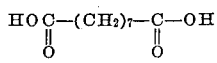

adipic and substituted adipic acids, maleic acid, glutaric and oxalic acid. The dibasic acid can contain other elements, such as N, S, P, Si, Cl, F, I, Br, B, etc. Also, under some conditions the chlorides can be used to form these new compounds, such as oxalyl chloride.

The compounds utilized for the anti-oxidant purposes of this invention are water insoluble, soluble in organic materials and have low volatility, a desirable combination of characteristics. The products formed from high M. Wt. dibasic acids are mostly white waxy solids.

The compounds of this invention can be prepared in general by reacting approximately one mole of the indicated dibasic acid anhydride or anhydrous acid in the presence of a water entraining solvent such as benzene, toluene or xylene with two moles of the para aminophenol. The solid product is then concentrated by evaporation, and the product is obtained in relatively pure form. If desired, the product can be washed with water or dilute sodium carbonate solution. The reaction product is indicated generally by Formula I above.

The following examples are given to illustrate this invention and include the preparation of the bis (p-hydroxy aryl amides) of dibasic acids of this invention, and test results on their use as anti-oxidants.

*Example I.—Preparation of bis(para-hydroxy phenyl amide) of dilinoleic acid*

54.5 g. of para-aminophenol were reacted with 140.2 g. of dilinoleic acid. The solvent for the reaction was 100 ml. of xylene. After eight hours on reflux 7.1 cc. of H₂O was removed by distillation from the reaction mixture. The yield of product was about 87 mole percent. Upon analysis this product was found to contain 3.70% nitrogen, while the theoretical nitrogen for the product was 3.75%. This sample had a melting point of 97° to 98° C.

*Example II.—Preparation of bis(para-hydroxy phenyl amide) of sebacic acid*

Two moles of para aminophenol (218 g.) were placed in a 1 l. three neck Pyrex R. B. flask fitted with a glass agitator, thermometer, and water cooled condenser that had a side arm take-off tube. To this flask was also added one mole of sebacic acid (202.25 g.). To act as a solvent and azeotroping agent 200 g. of xylene were also added. The mixture was heated under reflux for 12 hours. At the end of this time 95% of the theoretical amount of water (36 g.) had been removed. The final product was washed well with water, and dried. The structure of the compound is listed:

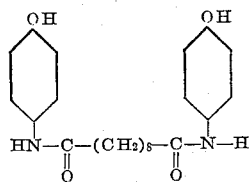

This product upon analysis had 7.31% nitrogen. The theoretical nitrogen was calculated to be 7.30%.

*Example III.—Preparation of bis(para-hydroxy phenyl amide) of alpha-omega-dicarboxy decane*

Two moles of para aminophenol were reacted with one mole of alpha-omega-dicarboxy decane The reacting conditions were the same as Example II. After the water had been all removed a high yield of anti-oxidant, white in color, was obtained.

*Example IV*

The product of Example I was tested for anti-oxidant effect on Paracril-26 (a butadiene-acrylonitrile synthetic rubber). N-lauryl-p-aminophenol and 2,6-ditertiary butyl 4-methyl phenol were utilized as control anti-oxidants. In all cases where an anti-oxidant was employed, 1 wt. percent was incorporated in the Paracril. The results follow:

ANTIOXIDANTS IN PARACRIL
[Temp. of aging 75° C.]

| Percent Anti-oxidant | Name or No. of Anti-oxidant | Percent Gel in Rubber After 1 Day | Percent Gel in Rubber After 7 Days | Percent Gel in Rubber After 12 Days |
|---|---|---|---|---|
| 1 | Product of Example I | 0.7 | 3.57 | 12.20 |
| 1 | N-Lauryl-p-aminophenol | 0.61 | 10.40 | 21.10 |
| 1 | 2,6-ditertiary butyl 4-methyl phenol | 3.8 | 21.80 | 40.80 |
| Blank | None | 22.8 | 70.80 | 89.64 |

The results establish that the anti-oxidants of this invention were far superior to the other well accepted anti-oxidants as a stabilizer for this particular synthetic rubber.

*Example V*

The bis(p-hydroxy aryl amides) of dibasic acids of this invention were tested for anti-oxidant effectiveness on a hydrocarbon product, a polyisobutylene synthetic rubber known as Vistanex. The results including control results are given below and indicate clearly the excellent anti-oxidant effect of the compounds of this invention. One wt. per cent of anti-oxidant was employed where indicated. The Vistanex in the form of small pieces was held in the oven on a watch glass. The results follow:

ANTIOXIDANTS IN POLYMERS

| Name of Polymer | Percent Anti-oxidant | Name or No. of Anti-oxidant | Original M. Wt. | Final M. Wt. After 15 Days @ 110° C. |
|---|---|---|---|---|
| Vistanex | 0 | Blank | 100,000 | 12,000 |
| Do | 1 | Product of Example I | 98,000 | 92,000 |
| Do | 1 | 2,6-ditertiary butyl 4-methyl phenol | 98,000 | 78,000 |
| Do | 1 | N-Lauryl-p-aminophenol | 99,000 | 89,000 |
| Do | 1 | Acetyl-p-aminophenol | 89,000 | 56,000 |

*Example VI*

Bis(p-hydroxy aryl amides) of dibasic acids were tested for oxidation inhibiting efficiency on GR–I rubber (low unsaturation isobutylene-diolefin polymer, see U. S. 2,356,128), a copolymer of isobutylene and isoprene. This test was conducted as follows: A small piece of control raw GR–I rubber containing no inhibitor was placed in a dark air oven maintained at a temperature of 110° C. Other pieces of GR–I rubber which had admixed 0.25% of various acyl-p-aminophenols and other anti-oxidants were placed in the oven. The rubbers were held in the oven in a 60 ml. glass weighing bottle. Staudinger molecular weights were determined before and after the aging on all samples. The results follow:

ANTIOXIDANTS IN POLYMERS

| Name of Polymer | Percent Anti-oxidant | Name or No. of Anti-oxidant | Original M. Wt. | Final M. Wt. After 15 Days @ 110° C. |
|---|---|---|---|---|
| GR-I Rubber | 0 | Blank | 44,000 | 8,000 |
| Do | 1 | Product of Example I | 44,000 | 42,000 |
| Do | 1 | 2,6-ditertiary butyl 4-methyl phenol. | 44,000 | 25,000 |
| Do | 1 | Phenyl beta naphthylamine. | 44,000 | 36,000 |

The results indicate that the compounds of this invention were far superior to control anti-oxidants employed.

*Example VII*

The compounds of this invention were tested in a lime base grease for anti-oxidant activity. The Norma Hoffman oxidation test was used. This test comprises placing the grease in glass sample dishes in an oxidation bomb at 210° F. and 110 lbs. of initial oxygen pressure, using 20 gram samples of the grease. The pressure drop is measured periodically. The results were as follows:

RESULTS IN MINERAL OIL GREASES

| Andok C Grease (Mineral oil base grease). | 0% Anti-oxidant | Norma Hoffman Oxygen Bomb Test. | In 100 hrs. lost 60 p. s. i. pressure and in 300 hrs. lost 79.5 p. s. i. pressure. |
|---|---|---|---|
| Do | 1% anti-oxidant Example I. | do | In 300 hrs. lost 27 lbs. p. s. i. pressure. |
| Do | 1% anti-oxidant Example II. | do | In 300 hrs. lost 38 lbs. p. s. i. pressure. |

The results indicate how grease was stabilized by the products of this invention.

*Example VIII*

Similar tests as in Example VII were performed on a different grease. The results follow:

RESULTS IN ESTER BASE GREASES

| Beacon 325 Li stearate in 2 ethyl hexylsebacate. | 0% anti-oxidant | Norma Hoffman Oxygen Bomb Test. | In 500 hrs. lost 45 lbs. p. s. i. pressure. |
|---|---|---|---|
| Do | 1% anti-oxidant Example I. | do | In 500 hrs. lost 5 lbs. p. s. i. pressure. |
| Do | 1% anti-oxidant Example II. | do | In 500 hrs. lost 6 lbs. p. s. i. pressure. |

The results indicate how grease was stabilized by the products of this invention.

The compounds utilized in this invention can also be employed as mill release agents, mold lubricants, food stabilizers and processing aids for rubber resins, and as anti-oxidants for such products as polyethylene, halogenated polyethylene, halogenated wax, S-polymer, halogenated natural rubber, halogenated isoprene polymers, halogenated GR-S, halogenated Vistanex, synthetic ester lubricants, plasticizers, etc. They are particularly adapted for the first and last uses mentioned because of their fluffy, light character.

It is to be seen from the above examples that the compounds of this invention provide markedly effective oxidation inhibition. As a result of these tests, it is contemplated in accordance with this invention that the class of inhibitors indicated may be used generally to stabilize solid oxidation unstable, organic mixtures. The amides are particularly adapted for use with waxes, rubbers, and wax polymer blends, such as polyethylene-wax blends, grease, etc.

The synthetic rubbers which preferably may be stabilized in accordance with this invention in addition to the GR-I and butadiene-acrylonitrile rubber are the polymers consisting predominantly of a polymerizable conjugated diolefin having four to six carbon atoms, e. g., 1,3-butadiene, isoprene, 2,3-dimethylbutadiene-1,3, 2-chlorobutadiene, piperylene, 2-methyl-pentadiene-1,3, and the like; hence synthetic rubbers of the above class include homo-polymers of these materials and also copolymers prepared by the polymerization of monomer mixtures comprising a major proportion of such a polymerizable diolefin and also containing a minor proportion of other monoethylenically unsaturated compounds copolymerizable with the diolefin such as alpha methyl acrylonitrile, styrene, methyl methacrylate, alpha methyl styrene, vinyl naphthalene, vinyl ketones, vinylidene chloride, diethyl fumarate, and the like. Natural rubber is also stabilized by the compounds of this invention.

The Vistanex (polyisobutylene synthetic rubber) compositions stabilized by the product of this invention have a Staudinger molecular weight of 40,000 to 300,000.

The incorporation of the compounds of this invention with the synthetic rubber may be carried out simply by adding the compounds either in the solid form or in solution, suspension or emulsion to the solid synthetic rubber during the milling operation or to a latex containing the synthetic rubber dispersed in an aqueous medium such as is ordinarily obtained by an emulsion polymerization process.

The amount of the indicated acyl-p-aminophenols added to the relatively non-volatile normally oxidizable organic material in order to prevent oxidation varies with different materials. In general the amount that has to be added to the solid, normally oxidizable material represents only a small proportion of the resulting compositions, i. e., 0.01-5 weight per cent in most cases.

The anti-oxidant compounds of this invention can also be employed to stabilize ester plasticized resin compositions, especially the polyvinyl resins. These resin compositions contain the various vinyl resins such as polyvinyl chloride, polyvinyl acetate, polyvinyl alcohol, mixed polymers of vinyl chloride with vinyl acetate, or vinylidene chloride, polyvinyl butyral or other polyvinyl acetals; nitrocellulose, ethyl cellulose; rubberlike polymers of diolefinic materials such as butadiene-nitrile (GR-A), butadiene-styrene (GR-S) or polychloroprene elastomers, or isobutylene-diolefin copolymers of the GR-I type, or other polymeric materials customarily requiring plasticization. Mixtures of these classes of materials may be used, such as a mixture of 100 parts by weight of vinyl chloride resin with 10 to 300 parts by weight of butadiene-acrylonitrile synthetic rubber of 15 to 40% nitrile.

The esters employed in these compositions are the branched alcohol esters of aliphatic and aromatic acids including phthalic acid, sebacic acid, oleic acid, stearic acid, lauric acid, maleic acid, etc. Diisooctyl phthalate is a particularly effective plasticizer. The plasticizers are utilized usually in proportions ranging from about 5 to 100 parts or preferably 30 to 60 parts per 100 parts of resin. The compounds of this invention are added in an amount indicated above based on the total composition.

The compounds of this invention may be utilized in conjunction with other anti-oxidants in order to obtain desirable combinations of properties. Among the other anti-oxidant materials which may be so employed are phenyl-beta-naphthylamine, naphthols, substituted naphthols, substituted phenols, substituted catechols, substituted hydroquinones, alkyl phenol sulfides, ketone-amine condensation products and the like. Due to the fact that the bis(p-hydroxy phenyl amides) of dibasic acids have good color, they may be mixed with 2,6-ditertiary-butyl-4-methyl phenol in rubber or resin compounds to form light colored stocks.

The anti-oxidant compounds of this invention have many advantages among which are their extreme potency, ease of preparation, good color retention, non-staining and odorless character and very low volatility.

Alkylated nuclear compounds as well as the halogenated compounds also have utility. Mixtures of the compounds of this invention may also be employed to secure the desired oxidation inhibiting activity.

It is to be understood that the invention is not limited to the specific examples which have been offered merely as illustrations, since other derivatives can be prepared, and that modifications may be made without departing from the spirit of the invention.

What is claimed is:

1. A composition of matter comprising a relatively non-volatile, solid, organic material normally subject to oxidative deterioration, containing a minor proportion effective as an anti-oxidant of another different material, a bis(p-hydroxy phenyl amide) of a dicarboxylic acid having the formula

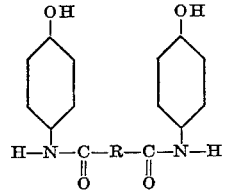

wherein R is a hydrocarbon radical selected from the group consisting of alkylene and alkenylene radicals.

2. A composition as in claim 1 in which the dicarboxylic acid contains at least 10 carbon atoms.

3. A stabilized synthetic rubber composition comprising a synthetic rubber having admixed therewith a minor proportion effective as an anti-oxidant of a bis(p-hydroxy phenyl amide) of a dicarboxylic acid having the formula

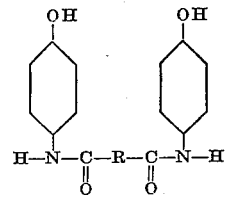

wherein R is a hydrocarbon radical selected from the group consisting of alkylene and alkenylene radicals.

4. A composition as in claim 3 in which the dicarboxylic acid contains at least 10 carbon atoms.

5. A stablized polyisobutylene synthetic rubber composition containing a bis(p-hydroxy phenyl amide) of a dicarboxylic acid having the formula

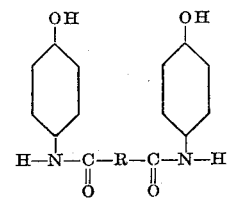

wherein R is a hydrocarbon radical selected from the group consisting of alkylene and alkenylene radicals as an inhibitor against oxidative deterioration, said polyisobutylene having a Staudinger molecular weight in the range of 40,000 to 300,000.

6. A composition as in claim 5 in which the dicarboxylic acid contains at least 10 carbon atoms.

7. The composition of claim 3 in which the R radical is derived from dilinoleic acid by the condensation reaction of two moles of para-aminophenol with one mole of dilinoleic acid.

8. The composition of claim 3 in which the R radical is derived from sebacic acid by the condensation reaction of two moles of para-aminophenol with one mole of sebacic acid.

9. A method of stablizing a relatively non-volatile, solid, organic material normally subject to oxidative deterioration which comprises adding thereto a minor proportion effective as an antioxidant of another different material, a bis(p-hydroxy phenyl amide) of a dicarboxylic acid having the formula

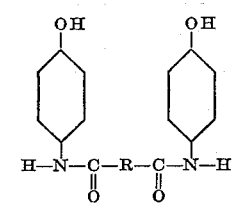

wherein R is a hydrocarbon radical selected from the group consisting of alkylene and alkenylene radicals.

10. The method of claim 9 in which the R radical is derived from dilinoleic acid by the condensation reaction of two moles of para-aminophenol with one mole of dilinoleic acid.

11. The method of claim 9 in which the R radical is derived from sebacic acid by the condensation reaction of two moles of para-aminophenol with one mole of sebacic acid.

(References on following page)

References Cited in the file of this patent

UNITED STATES PATENTS

| Number | Name | Date |
|---|---|---|
| 1,857,555 | Laska et al. | May 10, 1932 |
| 2,182,178 | Pinkernelle | Dec. 5, 1939 |
| 2,294,909 | Jennings | Sept. 8, 1942 |
| 2,330,291 | Kirby | Sept. 28, 1943 |
| 2,368,302 | Jennings | Jan. 30, 1945 |

OTHER REFERENCES

Beilstein: "Organische Chemie," vol. XIII, 1st supplement (1933), p. 165.

Beilstein: "Organische Chemie," vol. XIII (1930), pages 472, 474 and 476.